Jan. 14, 1936.　　S. M. BÄCKSTRÖM　　2,027,761
REFRIGERATION
Filed March 5, 1935　　2 Sheets-Sheet 1

INVENTOR.
BY Sigurd M. Bäckström
D. E. Heath
ATTORNEY.

Jan. 14, 1936.   S. M. BÄCKSTRÖM   2,027,761
REFRIGERATION
Filed March 5, 1935   2 Sheets-Sheet 2

INVENTOR.
Sigurd M. Bäckström
BY
D. C. Heath
ATTORNEY.

Patented Jan. 14, 1936

2,027,761

UNITED STATES PATENT OFFICE 2,027,761

REFRIGERATION

Sigurd Mattias Bäckström, Stockholm, Sweden, assignor, by mesne assignments, to Servel, Inc., Dover, Del., a corporation of Delaware Application March 5, 1935, Serial No. 9,362
In Germany March 7, 1934

10 Claims. (Cl. 62—119.3)

My invention relates to absorption refrigeration systems and more particularly to a process of and apparatus for expelling refrigerant vapor from solution in a part of the system generally known as a generator or boiler.

Refrigerant vapor should leave a generator of an absorption refrigeration system accompanied by as little vapor of absorption liquid as possible in order to minimize heat loss due to condensation of absorption liquid vapor in other parts of the system as in a rectifier or condenser. It is also desirable to maintain a body of solution in a generator at gradient concentration from the point of delivery of concentrated solution to a point where dilute solution is withdrawn. Especially for these reasons, it is desirable to prevent turbulence and convection of liquid in a generator and conduct expelled vapor through the liquid in a relatively long path of flow with respect to the depth of the liquid.

It is an object of my invention to provide simple and effective means for expelling refrigerant vapor from solution in a generator while restraining turbulence and convection of the solution and providing a relatively long path of flow of the expelled vapor through the liquid.

My invention is characterized by a novel restrictor or baffle in a generator and so constructed and arranged that the path of rising vapor bubbles is repeatedly reversed or sharply altered while motion of the liquid, tending to be accelerated by the gas, is impeded. The nature of my invention and the objects and advantages thereof will be more fully understood upon reference to the following description and accompanying drawings of which:

Figure 1:
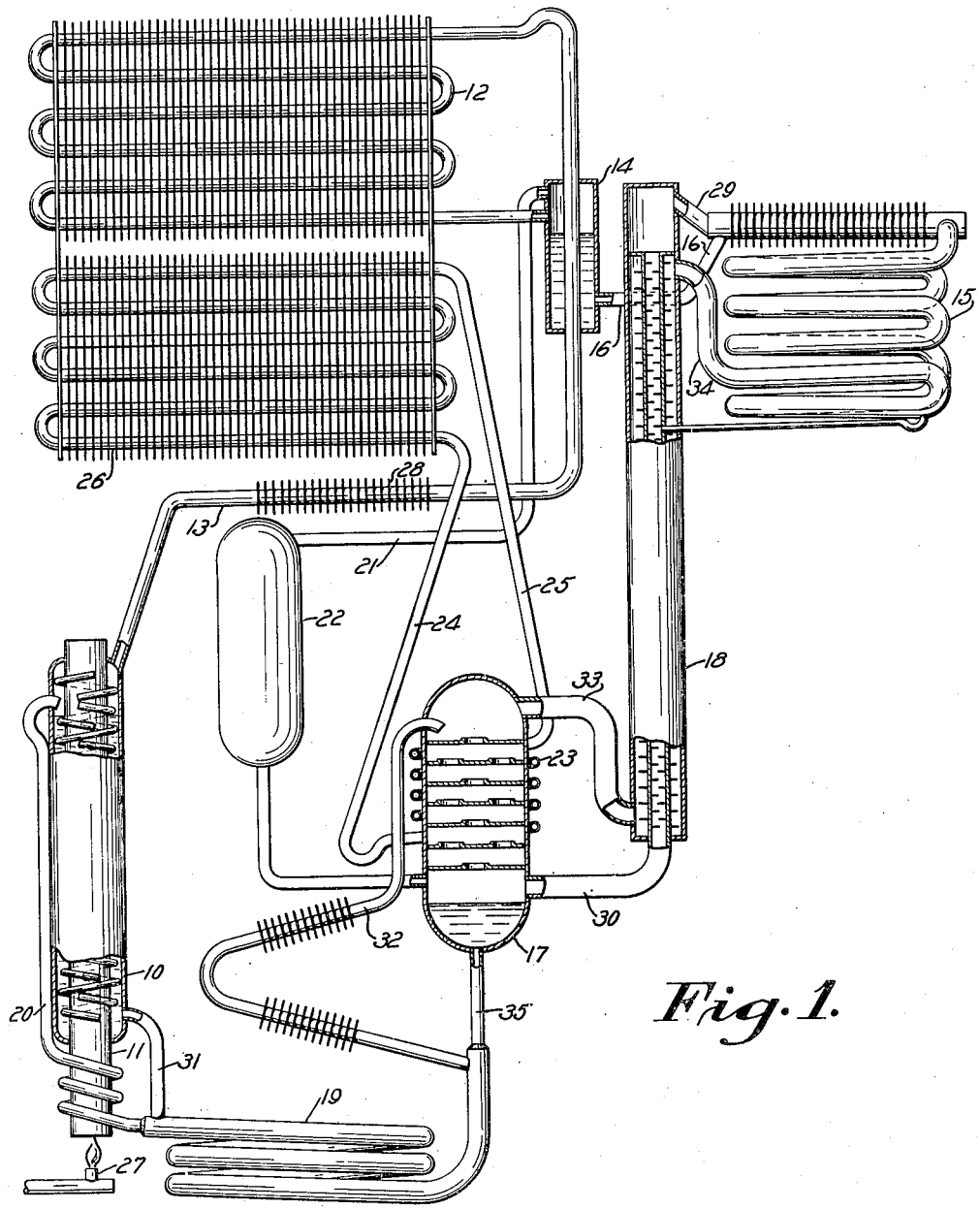
Fig. 1 shows more or less diagrammatically an absorption type refrigeration system provided with a generator embodying my invention.

Referring to Fig. 1 of the drawings, a generator 10 comprises an upright cylindrical vessel through which extends a tubular heating flue 11. The upper part of the generator 10 is connected to the upper end of an air cooled condenser 12 by a conduit 13. The lower end of the condenser 12 is connected to the upper part of a vessel 14, the latter forming a jacket around the conduit 13. The lower part of the vessel 14 is connected to the upper part of an evaporator 15 by an overflow conduit 16, the connection of conduit 16 to the evaporator 15 being made at such a level that liquid delivered to vessel 14 from the condenser 12 is retained in contact with a portion of conduit 13. An absorber 17 is interconnected through a gas heat exchanger 18 with the evaporator 15 for circulation of gas between the absorber and evaporator. The absorber 17 and the generator 12 are interconnected through a liquid heat exchanger 19 for circulation of liquid between the absorber and generator, a thermosiphon element 20 being provided to cause circulation of the liquid. The upper part of vessel 14, to which the lower end of the condenser 12 is connected, is connected to the absorber 17 by a conduit 21, which may be referred to as a vent. In the vent conduit 21 is connected a vessel 22, which may be referred to as a pressure vessel. The absorber 17 is provided with a cooling means comprising a vaporization-condensation element which consists of a cooling coil 23 arranged in thermal conductive relation with the absorber 17 and connected by conduits 24 and 25 to a second air cooled condenser 26.

The above described refrigeration system is charged with a suitable solution of refrigerant in an absorption liquid and an inert pressure equalizing gas. By way of illustration, the system may be charged with a 28% solution of ammonia in water, the solution being introduced into the system by means of a charging plug, not shown, in the absorber 17. The inert gas, for instance hydrogen, is then introduced into the system at a pressure corresponding to the condensing pressure of ammonia at a given condenser temperature, usually chosen on the basis of a fairly high room temperature.

In operation, the generator 10 is heated by any suitable means such as a burner 27 positioned so that the flame is projected into the lower end of the generator heating flue 11. In the generator 10, ammonia vapor is expelled from solution and passes through conduit 13 to the condenser 12. In the latter, the ammonia vapor condenses to liquid which flows into the vessel 14 around conduit 13. Due to the cooling effect of the liquid in vessel 14, water vapor is condensed out of the ammonia in conduit 13 and drains back to the generator 10. The vessel 14 is therefore referred to as a rectifier. The conduit 13 may also be provided with heat radiation fins 28 between the generator 10 and rectifier 14 to form what is usually referred to as an air cooled or high temperature rectifier.

From the rectifier vessel 14, liquid ammonia overflows through conduit 16 into the evaporator 15 where it flows downwardly, evaporating and diffusing into the hydrogen. The resulting gas mixture flows from the evaporator through conduit 29, gas heat exchanger 18, and conduit 30 into the lower part of the absorber 17. From the generator 10, weak absorption liquid flows through conduit 31, liquid heat exchanger 19, and conduit 32 into the upper part of the absorber 17 where it flows downwardly, absorbing ammonia out of the gas mixture. The resulting weak gas returns to the evaporator 15 through conduit 33, gas heat exchanger 18, and conduit 34. Enriched absorption solution flows from the absorber 17 through conduit 35, the gas heat exchanger 19, and the thermosiphon element 20 to the upper part of the generator 10. The lower part of the thermosiphon conduit 20 is arranged as a coil around the lower end of the heating flue 11. Heating of the rich absorption solution in this coil causes expulsion of ammonia vapor which rises through the thermosiphon conduit 20, causing upward flow of liquid therein, as well known in the art.

The pressure vessel 22 serves as a reservoir for hydrogen which is displaced into the inert gas circuit between the absorber and evaporator to increase the pressure in the system upon increase in room temperature. A full explanation of the function of the pressure vessel 22 may be had by reference to Patent No. 1,822,224 to D. B. Knight.

It is desirable to maintain the concentration of solution in the generator 10 graduated between the upper end, where the enriched solution is introduced by the thermosiphon element 20, and the lower end, where weak solution is withdrawn through conduit 31 for introduction into the absorber. It is also desirable to withdraw ammonia vapor from the generator 10 with as little entrained water vapor as possible in order to reduce rectification and condensation heat losses. In accordance with my invention I obtain these results by forming in the generator 10 an upward path of flow for gas bubbles through the solution, which path is considerably longer than the depth of the solution, being generally in the form of a spiral, but which is such as to cause a series of reversals in the direction of the ascending gas bubbles with respect to the liquid.

Figure 2:
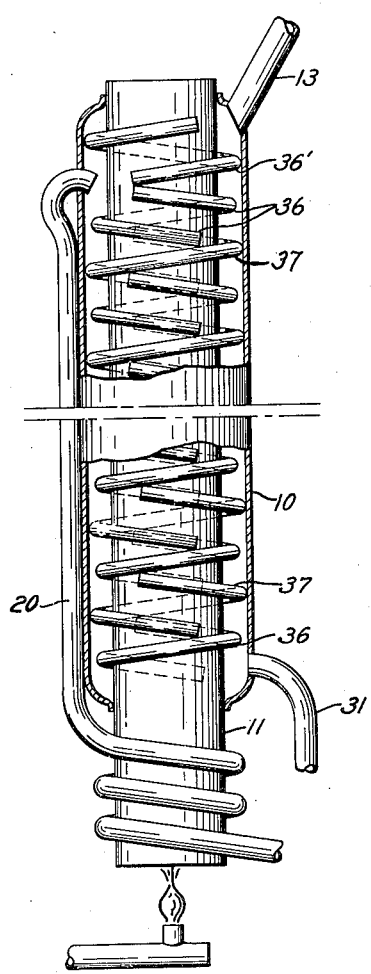
Fig. 2 is a detail vertical section of the generator shown in Fig. 1.

One form of my invention is best illustrated in Fig. 2. I form a plurality of right-hand (proceeding upwardly) spirals 36, each of an inside diameter equal to the diameter of the outside of the generator flue 11 and comprising approximately one and one-quarter turns. I also form a plurality of similar left-hand spirals 36 having an outside diameter equal to the inside diameter of the generator casing. These spirals may be formed from steel wire or rods having a diameter somewhat less than the width of the space between the generator casing and the flue 11. The spirals 36 and 37 are placed in the generator 10 around the flue 11 by stacking them one above the other so that the stack comprises alternate right and left hand spirals, each of about one and one-quarter turns. The bottom spiral 36 may be spaced above the bottom of the generator as, for instance, by welding to the flue 11. This is for the purpose of leaving an unrestricted space adjacent the point at which the conduit 31 is connected to the generator for withdrawal of dilute or weak solution.

Vapor bubbles formed adjacent the flue 11 will ascend beneath the spirals 36, and vapor bubbles formed nearer to the generator casing will ascend upwardly beneath the spirals 37. As vapor bubbles reach the upper end of each of the spirals, they will escape upwardly beneath the next higher spiral through the space which is on the inside of the spirals 37 and on the outside of the spirals 36. It will now be understood that the vapor bubbles take a tortuous path upwardly through the liquid in the generator and that the movement of liquid which tends to be accelerated by the flow of gas is dampened by the reversals in the direction of flow caused by the change in direction of the alternate left and right hand spirals.

Figure 3:
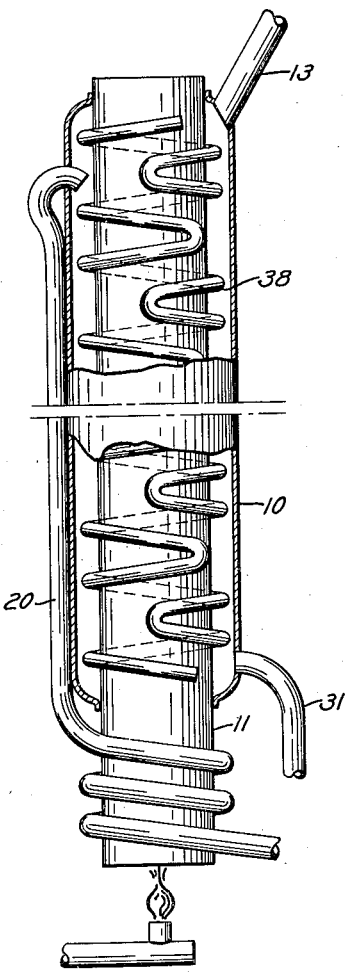
Fig. 3 is a vertical section of a generator embodying a modification of my invention.
Figure 4:
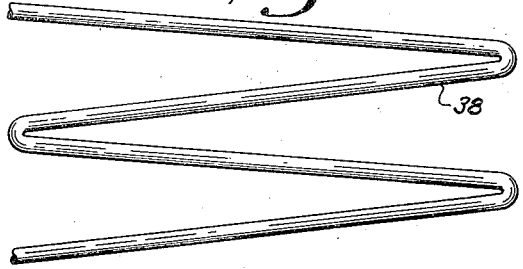
Fig. 4 is a detail view showing the spiral element in the generator illustrated in Fig. 3, resolved into a plane.

In Fig. 3, I have shown a slightly modified embodiment of my invention in which the alternate spirals are formed by a single wire or rod 38 which is wound in a particular manner around the flue 11 within the generator 10. The wire 38 may first be bent in a zigzag shape as illustrated in Fig. 4 and then bent around the flue 11 as shown in Fig. 3. In practice, the wire 38 may be pre-formed by bending around a suitable mandrel and then slipped over the flue 11.

Various other changes may be made without departing from the spirit of my invention which is therefore not limited to that which is shown in the drawings or described in the specification but only as indicated in the following claims.

What is claimed is:

1. The combination in a refrigeration system with an absorber, a generator vessel, and means for circulating absorption liquid between the generator vessel and the absorber so that liquid flows downwardly in the generator vessel and thence to the absorber, of oppositely oblique members in said generator vessel for causing vapor flowing upwardly through the generator to repeatedly reverse its direction of flow and liquid flowing downwardly in the generator to repeatedly reverse its direction of flow.

2. The combination in a refrigerating system of the absorption type including a generator vessel, means to withdraw vapor from the upper part of the generator vessel, a separate absorber, and thermosiphon means for circulating liquid between the generator vessel and the absorber so that liquid flows downwardly in the generator vessel and from the generator vessel to the absorber, of a flue in the generator vessel forming an annular space and a plurality of hairpin-like members in said annular space for causing an extended path of flow for vapor and liquid and repeated reversals of flow of both vapor and liquid while the vapor and liquid are flowing in counter-flow relation, whereby a marked concentration gradient is maintained in the generator vessel and the vapor leaving the upper part of the generator vessel is well deprived of vapor of absorption liquid.

3. That improvement in the art of refrigeration which comprises maintaining an upright column of a solution of absorption liquid and refrigerant, introducing strong solution at the upper end of said column, withdrawing weak solution from the lower end of said column, heating said column, and producing progressively different concentrations of said solution along the length of said column by limiting vertical movement of the solution in a series of oppositely spiralled paths.

4. That improvement in the art of refrigeration which comprises maintaining an upright column of a solution of absorption liquid and refrigerant, introducing strong solution at the upper end of said column, withdrawing weak solution from the lower end of said column, applying heat to the lower end of said column to evolve gaseous refrigerant from solution, producing progressively different concentrations of said solution along the length of said column by limiting vertical movement of the solution in a series of oppositely spiralled paths, and conducting the gaseous refrigerant upwardly in a tortuous path.

5. In an absorption refrigeration apparatus, a vertical generator for containing a solution of absorption liquid and refrigerant, means for introducing strong solution at the upper end of said generator, means for withdrawing weak solution from the lower end of said generator, means for heating said generator, and means presenting a series of oppositely spiralled paths affording a tortuous upward path of flow for vapor through said solution and a relatively great resistance to movement of the liquid for producing progressively different concentrations of said solution along the length of the generator.

6. In an absorption refrigeration apparatus, an absorber, a vessel adapted to hold a vertical column of solution of absorption liquid and refrigerant, means for conducting strong absorption liquid from said absorber to the upper part of said column, means to heat the lower part of said column to cause vapor to be evolved and flow upwardly therein, a plurality of oppositely spiralled members within said liquid column for producing progressively different concentrations of said solution along the length of said column, and means for conducting liquid from the lower part of said column to said absorber.

7. In an absorption refrigeration apparatus, a vertical cylindrical generator for containing a solution of absorption liquid and refrigerant, a tubular heating flue extending upwardly through said generator and forming a substantially annular space for said solution, means for introducing strong solution at the upper end of said generator, means for withdrawing weak solution from the lower end of said generator, and means forming a vertical series of oppositely spiralled paths in said annular space.

8. In an absorption refrigeration apparatus, a vertical cylindrical generator for containing a solution of absorption liquid and refrigerant, a tubular heating flue extending upwardly through said generator and forming a substantially annular space for said solution, means for introducing strong solution at the upper end of said generator, means for withdrawing weak solution from the lower end of said generator, and a vertical series of alternate left and right hand spiral baffles in said annular space.

9. In an absorption refrigeration system having an evaporator, an absorber, a condenser, and system inter-connections therebetween, a generator, and means presenting a plurality of oppositely spiralled paths closely adjacent throughout the liquid space of the generator for restricting the movement of liquid within said space.

10. In an absorption refrigeration system having an evaporator, an absorber, a condenser, and system inter-connections therebetween, a generator, and a plurality of oppositely spiralled baffles located closely adjacent throughout substantially the entire liquid space of the generator for restricting longitudinal movement of liquid within said space.

SIGURD MATTIAS BÄCKSTRÖM.